(12) United States Patent
Komizo et al.

(10) Patent No.: US 11,333,211 B2
(45) Date of Patent: May 17, 2022

(54) BRAKE DEVICE

(71) Applicant: ADVICS CO., LTD., Kariya (JP)

(72) Inventors: Yohei Komizo, Takahama (JP); Jin Yamada, Anjyo (JP)

(73) Assignee: ADVICS CO., LTD., Kariya (JP)

( * ) Notice: Subject to any disclaimer, the term of this patent is extended or adjusted under 35 U.S.C. 154(b) by 66 days.

(21) Appl. No.: 16/981,198

(22) PCT Filed: Mar. 28, 2019

(86) PCT No.: PCT/JP2019/013781
§ 371 (c)(1),
(2) Date: Sep. 15, 2020

(87) PCT Pub. No.: WO2019/189653
PCT Pub. Date: Oct. 3, 2019

(65) Prior Publication Data
US 2021/0062882 A1 Mar. 4, 2021

(30) Foreign Application Priority Data
Mar. 29, 2018 (JP) .............................. JP2018-065962

(51) Int. Cl.
*F16D 65/28* (2006.01)
*F16D 65/22* (2006.01)
(Continued)

(52) U.S. Cl.
CPC .............. *F16D 65/22* (2013.01); *B60T 13/74* (2013.01); *B60T 13/746* (2013.01); *F16D 2121/24* (2013.01); *F16D 2125/40* (2013.01)

(58) Field of Classification Search
CPC .. F16D 65/22; F16D 2121/24; F16D 2125/40; B60T 13/741; B60T 13/746; B60T 7/107
See application file for complete search history.

(56) References Cited

U.S. PATENT DOCUMENTS 5,180,038 A * 1/1993 Arnold .................. B60T 13/743
188/171
2014/0020997 A1 1/2014 Bach et al.
(Continued)

FOREIGN PATENT DOCUMENTS

CN 1391332 A 1/2003
DE 102007002907 A1 4/2009
(Continued)

OTHER PUBLICATIONS

Abstract for JP 2019116965 (2019).*
(Continued)

*Primary Examiner* — Nicholas J Lane
(74) *Attorney, Agent, or Firm* — Buchanan Ingersoll & Rooney PC

(57) ABSTRACT

A motion conversion mechanism of a brake device includes a rotation member and a linear motion member that linearly moves accompanying the rotation of the rotation member. The rotation member is rotationally driven through a third gear. A male screw and a female screw mesh with each other on the side opposite to the brake shoe of the third gear, where one end of an actuating member receives a force for actuating the brake shoe from the linear motion member, and the other end actuates the brake shoe. The guide member that guides the actuating member is made of a material different from that of the rotation member, and slidably guides the actuating member in the axial direction.

19 Claims, 12 Drawing Sheets

(51) Int. Cl.
  *B60T 13/74*   (2006.01)
  *F16D 121/24*  (2012.01)
  *F16D 125/40*  (2012.01)

(56) References Cited

U.S. PATENT DOCUMENTS

2014/0027221 A1*  1/2014  Akada .................. F16D 65/22
                                              188/325
2014/0345989 A1*  11/2014 Oshio ................. B60T 13/746
                                              188/162

FOREIGN PATENT DOCUMENTS

| | | | | |
|---|---|---|---|---|
| JP | 2014504711 | A | 2/2014 | |
| JP | 2018-017257 | A | 2/2018 | |
| JP | 2019116965 | A * | 7/2019 | ............. F16D 65/09 |

OTHER PUBLICATIONS

International Search Report (PCT/ISA/210) dated Jul. 2, 2019, by the Japanese Patent Office as the International Searching Authority for International Application No. PCT/JP2019/013781.
Written Opinion (PCT/ISA/237) dated Jul. 2, 2019, by the Japanese Patent Office as the International Searching Authority for International Application No. PCT/JP2019/013781.

* cited by examiner

BRAKE DEVICE

TECHNICAL FIELD

The present disclosure relates to a brake device.

BACKGROUND ART

Brake devices known in the art have a motion conversion mechanism including a rotation member that rotates in conjunction with an output shaft of a motor and a linear motion member that linearly moves according to the rotation of the rotation member. The liner motion member pulls on a cable and moves a brake shoe to break a vehicle. (e.g., Patent Literature 1 and Patent Literature 2). In Patent Literature 1, the linear motion member having a male screw linearly moves according to the rotation of the rotation member having a female screw. In Patent Literature 2, a member for transmitting the rotation of the output shaft of the motor is connected to the shaft end face of the rotation member on the side far from the brake shoe.

CITATIONS LIST

Patent Literature

Patent Literature 1: Japanese Translation of PCT International Application Publication No. 2014-504711
Patent Literature 2: German Patent Application Publication No. 102007002907

SUMMARY OF INVENTION

Technical Problems

In a brake device in which a linear motion member having a male screw linearly moves according to the rotation of a rotation member having a female screw, as in Patent Literature 1, the diameter of a bearing that supports the rotation member tends to become large, which results in increase in size of the brake device.

Furthermore, in a brake device in which an output shaft of a motor or a member that rotates in conjunction with the output shaft is coupled to an axial end face of the rotation member of the motion conversion mechanism, as in Patent Literature 2, the size of the brake device becomes large in an axial direction.

Therefore, one of the objects of the present disclosure is to obtain a brake device having a novel configuration with less inconvenience, for example, a more compact size.

Solutions to Problems

A brake device of the present disclosure relates to, for example, a brake device including: a braking member that is pressed against a drum rotor that rotates integrally with a wheel to brake the drum rotor; a backing plate that supports the braking member; and an electric actuator that is provided on the backing plate and that actuates the braking member, where
 the electric actuator includes,
 a motor having a rotating output shaft, a motion conversion mechanism including a rotation member that includes a male screw and rotates about an axis center of the male screw in conjunction with the output shaft, and a linear motion member that includes a female screw that meshes with the male screw and linearly moves accompanying the rotation of the rotation member, an actuating member that receives a force for actuating the braking member from the linear motion member, and a guide member that guides the actuating member;
 the rotation member is rotationally driven through a driven part that is provided on an outer periphery of the rotation member and rotates in conjunction with the output shaft; the male screw and the female screw mesh with each other on a side opposite to the braking member of the driven part; the actuating member is configured such that one end receives a force for actuating the braking member from the linear motion member and the other end actuates the braking member; the rotation member is provided with a through-hole that lies along an axial direction of the axis center; the actuating member passes through the through-hole; the one end of the actuating member is located on a side opposite to the braking member of the through-hole; and the guide member is made of a material different from that of the rotation member and slidably guides the actuating member in the axial direction.

According to such a configuration, for example, as compared with an aspect in which the linear motion member having the male screw linearly moves according to the rotation of the rotation member having the female screw as in Patent Literature 1, the electric actuator can be further downsized in the radial direction since the diameter of the bearing supporting the rotation member tends to be small, and as smaller diameter of the bearing reduces the sliding speed of the bearing at the same rotation speed, durability such as wear resistance can be easily improved. Furthermore, for example, as compared with an aspect in which the output shaft of the motor or a member that rotates in conjunction with the output shaft is coupled to an end face in the axial direction of the rotation member of the motion conversion mechanism as in Patent Literature 2, the entire length of the electric actuator can be further shortened easily. Therefore, an advantage in that the in-vehicle space can be easily ensured by the miniaturization of the electric actuator and an advantage in that durability can be improved are obtained. Furthermore, for example, as compared with an aspect in which the male screw and the female screw mesh with each other on the braking member side with respect to the driven part, the driven part can be arranged closer to the braking member. Therefore, for example, since a relatively large portion for accommodating the driven part of the body and the case does not need to be provided on the side far from the braking member of the brake device, advantages such as the brake device can be configured more compactly, and the vibration energy when the brake device vibrates can be made smaller are obtained. Then, for example, as compared with an aspect in which the actuating member is arranged so as to circumvent the outside in the radial direction, the actuating member can be arranged in a linearly extended state closer to the axis center of the rotation member, and thus the reaction force applied to the actuation of the braking member can be suppressed from acting in the direction intersecting the axis center. Furthermore, since the electric actuator includes the guide member that slidably guides the actuating member in the axial direction, the sliding resistance involved in the movement of the actuating member can be further reduced. Moreover, compared to the configuration without the guide member, the actuating member and the inner peripheral surface of the through-hole of the rotation member become difficult to directly slide with respect to each other, and consequently, effects such as the sliding resistance becomes smaller and the actuating member and the inner peripheral surface are less likely to be worn out are obtained.

DESCRIPTION OF EMBODIMENTS

Figure 1:
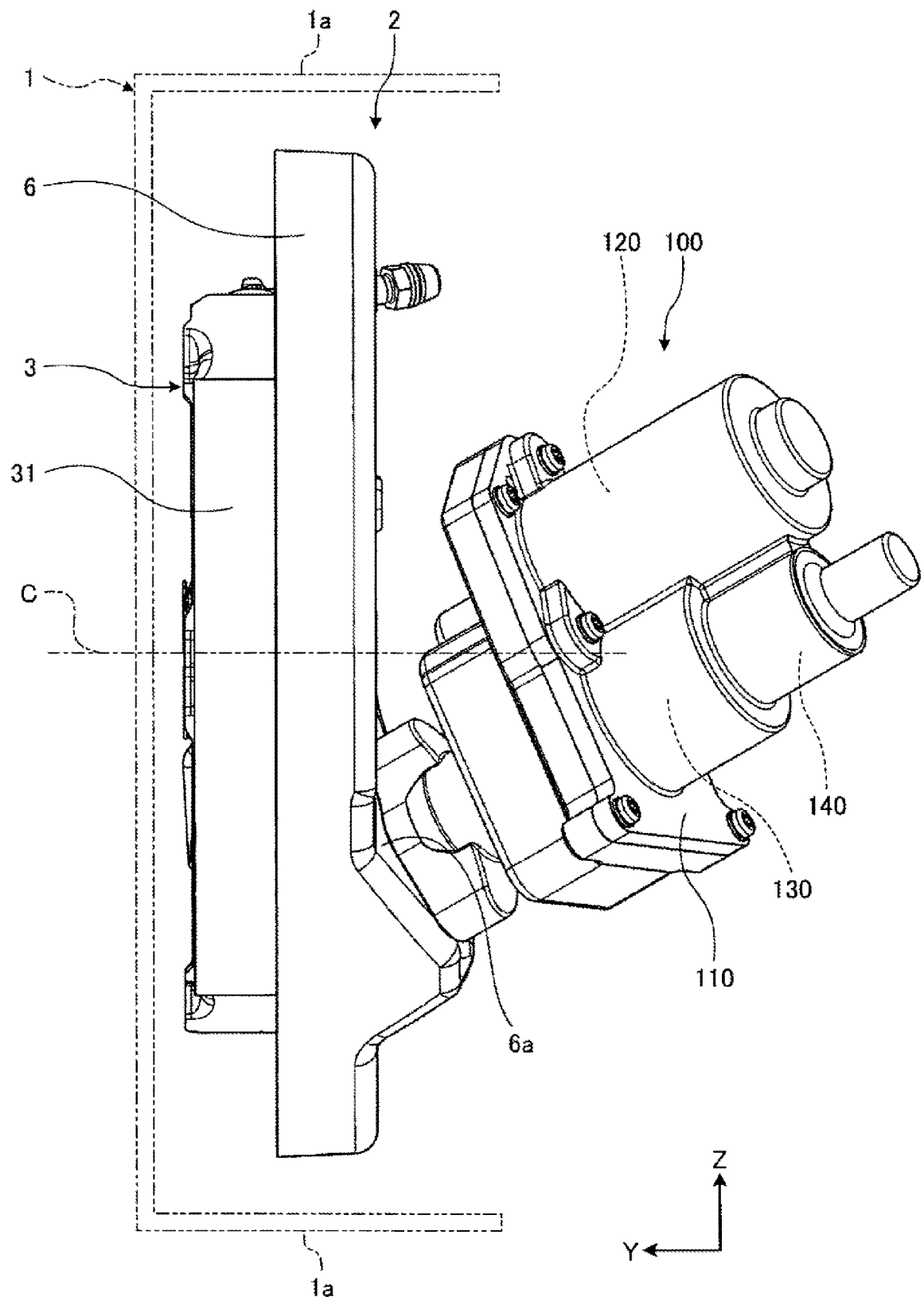
FIG. 1 is an exemplary and schematic rear view of a brake device of a first embodiment as seen from a rear side of a vehicle.

An exemplary embodiment of the present disclosure will be disclosed below. The configurations of the embodiments and modified examples described below, as well as the operations and results (effects) provided by the configurations are merely examples. The present disclosure can also be realized with configurations other than the configurations disclosed in the following embodiments and the modified examples. Furthermore, according to the present disclosure, it is possible to obtain at least one of the various effects including derivative effects obtained by the configuration.

The following embodiments and modified examples include similar components. Therefore, in the following, similar components may be given common reference numerals, and redundant description may be omitted. Furthermore, in the present specification, the ordinal numbers are given for convenience of distinguishing components, parts, and the like, and do not indicate the priority or the order.

Furthermore, in each drawing, the direction which is the axial direction of a third rotation center Ax3 and in which a transmission member 210 (one end of an actuating member 200) is separated from a brake shoe 3 (braking member) and in a braking state is indicated by an arrow D1, and the direction which is the axial direction of the third rotation center Ax3 and in which an end portion 150a is close to the brake shoe 3 (braking member) and in a non-braking state is indicated by an arrow D2. Hereinafter, unless otherwise stated, the axial direction of the third rotation center Ax3 is simply referred to as the axial direction, the radial direction of the third rotation center Ax3 is simply referred to as the radial direction, and the circumferential direction of the third rotation center Ax3 is simply referred to as the circumferential direction.

First Embodiment

[Configuration of Brake Device]

Figure 2:
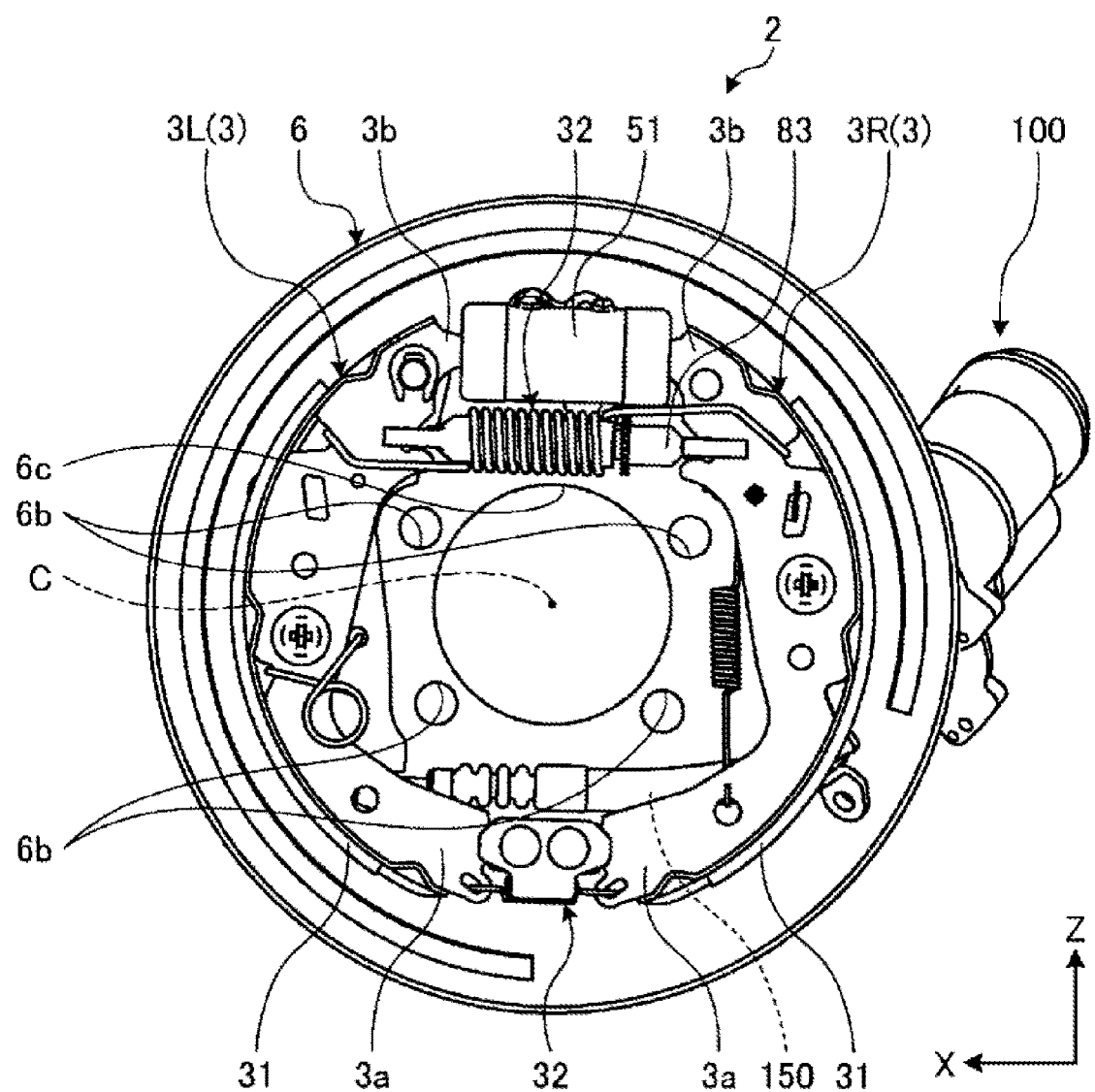
FIG. 2 is an exemplary and schematic side view of the brake device of the first embodiment as seen from an outside in a vehicle width direction.
Figure 3:
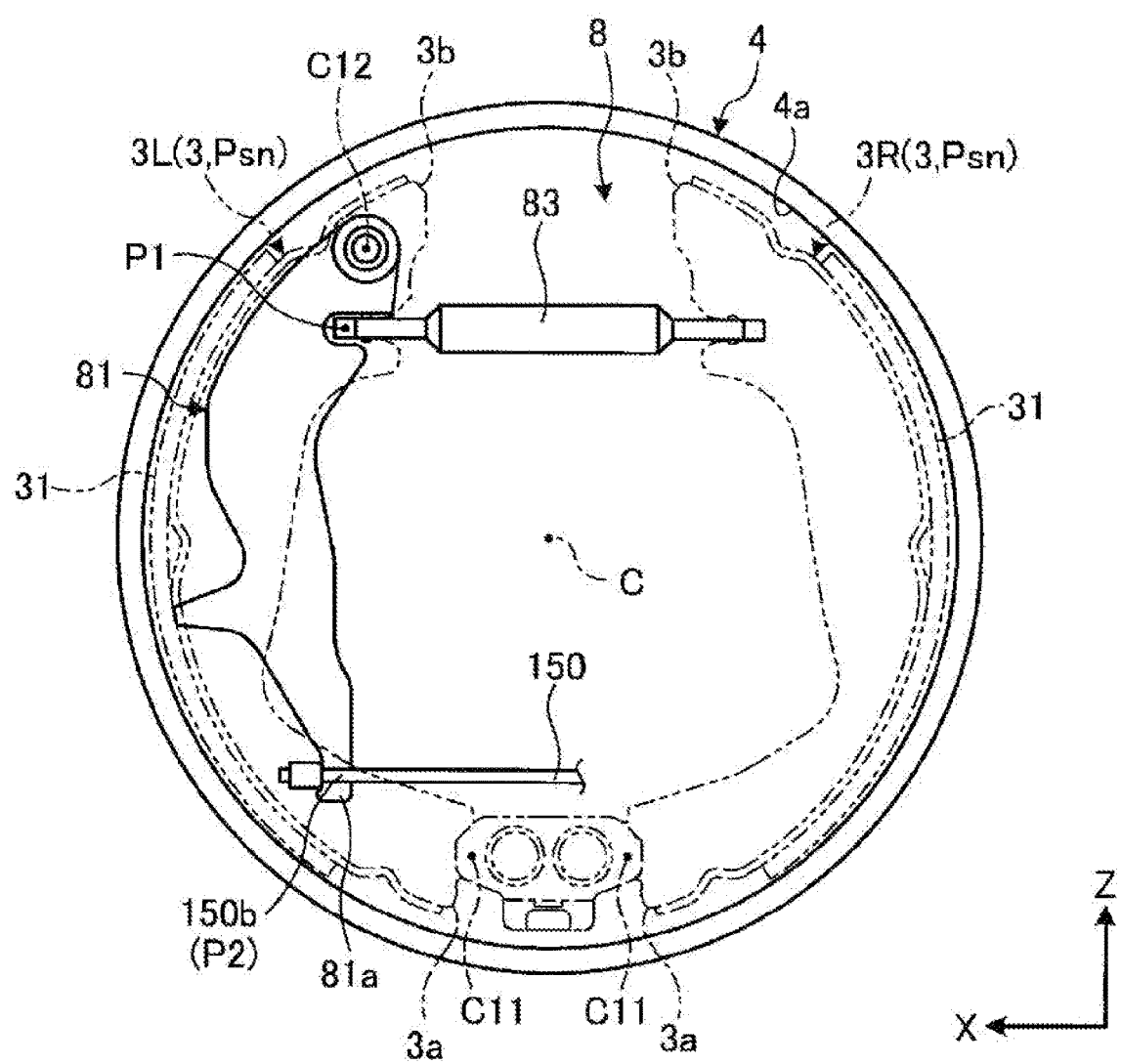
FIG. 3 is an exemplary and schematic side view of the operation of a braking member by a moving mechanism of the brake device of the first embodiment, and is a view in a non-braking state.
Figure 4:
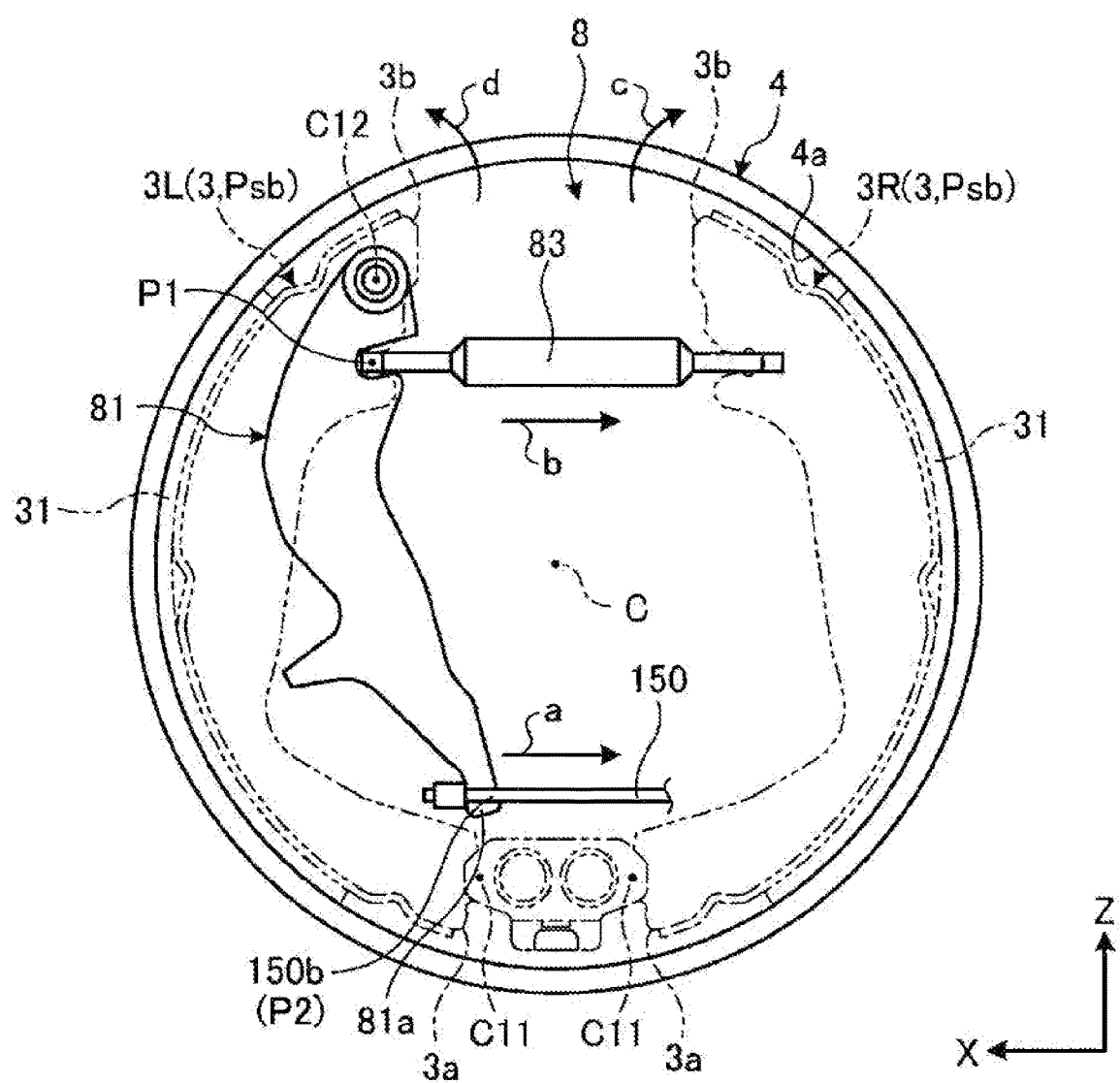
FIG. 4 is an exemplary and schematic side view of the operation of the braking member by the moving mechanism of the brake device of the first embodiment, and is a view in a braking state.

FIG. 1 is a rear view of a brake device 2 for a vehicle according to the present embodiment as seen from a rear side of the vehicle. FIG. 2 is a side view of the brake device 2 as seen from an outside in a vehicle width direction. FIG. 3 is a side view showing an operation of the brake shoe 3 (braking member) by a moving mechanism 8 of the brake device 2, and is a view in a non-braking state. FIG. 4 is a side view showing an operation of the brake shoe 3 by the moving mechanism 8 of the brake device 2, and is a view in a braking state.

As shown in FIG. 1, the brake device 2 is accommodated on an inside of a peripheral wall 1a of a cylindrical wheel 1. The brake device 2 is a so-called drum brake. As shown in FIG. 2, the brake device 2 includes two brake shoes 3 that are spaced apart from each other in the front-rear direction. As shown in FIGS. 3 and 4, the two brake shoes 3 extend in an arc-shape along an inner peripheral surface 4a of a cylindrical drum rotor 4. The drum rotor 4 rotates integrally with the wheel 1 about a rotation center C extending in the vehicle width direction (Y direction). The two brake shoes 3 move so as to come into contact with the inner peripheral surface 4a of the cylindrical drum rotor 4. Thus, the drum rotor 4, and thus the wheel 1 are braked by the friction between the brake shoe 3 and the drum rotor 4. The brake shoe 3 is an example of a braking member.

The brake device 2 is an actuator for moving the brake shoe 3. The brake device 2 includes a wheel cylinder 51 (see FIG. 2) that is operated by hydraulic pressure and a motor 120 that is operated by electricity. The wheel cylinder 51 can move the two brake shoes 3. The motor 120 an move the two brake shoes 3. The wheel cylinder 51 may be operated for braking during traveling. The motor 120 may be operated for braking during parking. That is, the brake device 2 is an example of an electric parking brake. The motor 120 may be operated for braking during traveling.

As shown in FIGS. 1 and 2, the brake device 2 includes a disk-shaped backing plate 6. The backing plate 6 intersects the rotation center C. That is, the backing plate 6 spreads substantially along the direction intersecting the rotation center C, specifically, substantially along the direction orthogonal to the rotation center C. As shown in FIG. 1, the components of the brake device 2 are on both the outside and the inside of the backing plate 6 in the vehicle width direction. The backing plate 6 directly or indirectly supports each component of the brake device 2. The backing plate 6 is connected to a connecting member (not shown) with the vehicle body. The connecting member may be a part of the suspension (e.g., arm, link, mounting member, or the like). An opening 6b provided in the backing plate 6 shown in FIG. 2 is used for coupling with the connecting member. The brake device 2 can be installed for both driving wheels and non-driving wheels. If the brake device 2 is installed for driving wheels, an axle (not shown) passes through the opening 6c provided in the backing plate 6 shown in FIG. 2.

[Actuation of Brake Shoe by Wheel Cylinder]

The wheel cylinder 51, the brake shoe 3 and the like shown in FIG. 2 are arranged on the outside of the backing plate 6 in the vehicle width direction. The brake shoe 3 is movably supported by the backing plate 6. Specifically, as shown in FIG. 3, a lower end portion 3a of the brake shoe 3 is supported by the backing plate 6 (shown in FIG. 2) in a rotatable state about the rotation center C11. The rotation center C11 extends substantially parallel to the rotation center C of the wheel 1. Furthermore, as shown in FIG. 2, the wheel cylinder 51 is supported at an upper end portion of the backing plate 6. The wheel cylinder 51 has two movable parts not shown, which may be, pistons, that can move in the front-rear direction (left-right direction in FIG. 2) of the vehicle. That is, the two movable parts are moved by hydraulic pressure in the wheel cylinder 51. The movable part pushes against the upper end portions 3b of the brake shoes 3. When the two movable parts press against the two brake shoes 3, the brake shoes 3 moves about the rotation center C11 (shown in FIGS. 3 and 4). Further, the upper end portions 3b move away from each other in the vehicle front-rear direction. As a result, the two brake shoes 3 move radially outward of the rotation center C of the wheel 1. A band-shaped lining 31 that lies along the cylindrical surface is provided on the outer peripheral portion of each brake shoe 3. Therefore, as shown in FIG. 4, the lining 31 and the inner peripheral surface 4a of the drum rotor 4 come into contact with each other by moving the two brake shoes 3 radially outward of the rotation center C. The drum rotor 4 and thus the wheel 1 (shown in FIG. 1) are braked by the friction between the lining 31 and the inner peripheral surface 4a. Furthermore, the brake device 2 includes a return member 32 as shown in FIG. 2. When the operation of pushing the brake shoe 3 by the wheel cylinder 51 is released, the return member 32 moves the two brake shoes 3 from a position (braking position Psb, shown in FIG. 4) of making contact with the inner peripheral surface 4a of the drum rotor 4 to a position (non-braking position Psn, initial position, shown in FIG. 3) of not making contact with the inner peripheral surface 4a of the drum rotor 4. The return member 32 is, for example, an elastic member such as a coil spring. The return member 32 applies a force acting in a direction of the other brake shoe 3, which is a force separating from the inner peripheral surface 4a of the drum rotor 4, to the brake shoe 3.

[Configuration of Moving Mechanism and Actuation of Brake Shoe by Moving Mechanism]

The brake device 2 includes the moving mechanism 8 shown in FIGS. 3 and 4. The moving mechanism 8 moves the two brake shoes 3 from the non-braking position Psn (shown in FIG. 3) to the braking position Psb (shown in FIG. 4) by the actuation of the electric actuator 100 (shown in FIG. 5) including the motor 120. The moving mechanism 8 is provided on the outside of the backing plate 6 in the vehicle width direction. The moving mechanism 8 includes a lever 81, a cable 150, and a strut 83. The lever 81 may be provided between one of the two brake shoes 3 the left brake shoe 3L (shown in FIGS. 3 and 4) and the backing plate 6 so that the brake shoe 3L and the backing plate 6 overlap in the axial direction of the rotation center C of the wheel. The lever 81 is supported by the brake shoe 3L so as to be rotatable about the rotation center C12. The rotation center C12 (upper side in FIGS. 3 and 4) is located at the end portion of the brake shoe 3L on the side away from the rotation center C11 and is substantially parallel to the rotation center C11. The cable 150 moves the lower end portion 81a of the lever 81 on the side far from the rotation center C12. The cable 150 moves the lower end portion 81 in the direction of approaching the right brake shoe 3R shown in FIGS. 3 and 4 (see arrow in FIG. 4). The cable 150 moves substantially along the backing plate 6. The strut 83 is interposed between the lever 81 and the brake shoe 3R different from the brake shoe 3L on which the lever 81 is supported. The strut 83 stretched between the lever 81 and the different brake shoe 3R. A connecting position P1 between the lever 81 and the strut 83 is set between the rotation center C12 and a connecting position P2 between the end portion 150b of the cable 150 (other end of the actuating member 200) and the lever 81. The cable 150 may be made of, for example, a metal material such as iron and aluminum alloy.

In such a moving mechanism 8, when the cable 150 is pulled and moved toward the right in FIG. 4, the lever 81 moves toward the brake shoe 3R (arrow a), and the lever 81 pushes the brake shoe 3R toward the right in FIG. 4 through the strut 83 (arrow b). As a result, the brake shoe 3R rotates from the non-braking position Psn (FIG. 3) about the rotation center C11 (arrow c in FIG. 4) and moves to the braking position Psb (FIG. 4) where it comes into contact with the inner peripheral surface 4a of the drum rotor 4. In this state, the connecting position P2 between the cable 150 and the lever 81 corresponds to the force point, the rotation center C12 corresponds to the fulcrum, and the connecting position P1 between the lever 81 and the strut 83 corresponds to the action point. Furthermore, when the lever 81 moves toward the right in FIG. 4, that is, the direction in which the strut 83 pushes the brake shoe 3R (arrow b) in a state where the brake shoe 3R is in contact with the inner peripheral surface 4a, the strut 83 stretches, so that the lever 81 rotates in a direction opposite to the moving direction of the lever 81, that is, counterclockwise in FIGS. 3 and 4, with the connecting position P1 with the strut 83 as a fulcrum (arrow d). Thus, the brake shoe 3L rotates from the non-braking position Psn (FIG. 3) about the rotation center C11 and moves to the braking position Psb (FIG. 4) where it comes into contact with the inner peripheral surface 4a of the drum rotor 4. Both brake shoes 3L, 3R thereby move from the non-braking position Psn (FIG. 3) to the braking position Psb (FIG. 4) by the actuation of the moving mechanism 8. In a state after the brake shoe 3R is brought into contact with the inner peripheral surface 4a of the drum rotor 4, the connecting position P1 between the lever 81 and the strut 83 becomes the fulcrum. The amount of movement of the brake shoes 3L, 3R is very small, for example, 1 mm or less.

[Electric Actuator]

As shown in FIG. 1, the electric actuator 100 is fixed to the backing plate 6 in a state of projecting out from the surface 6a on the inside of the backing plate 6 in the vehicle width direction to the side opposite to the brake shoes 3.

Figure 5:
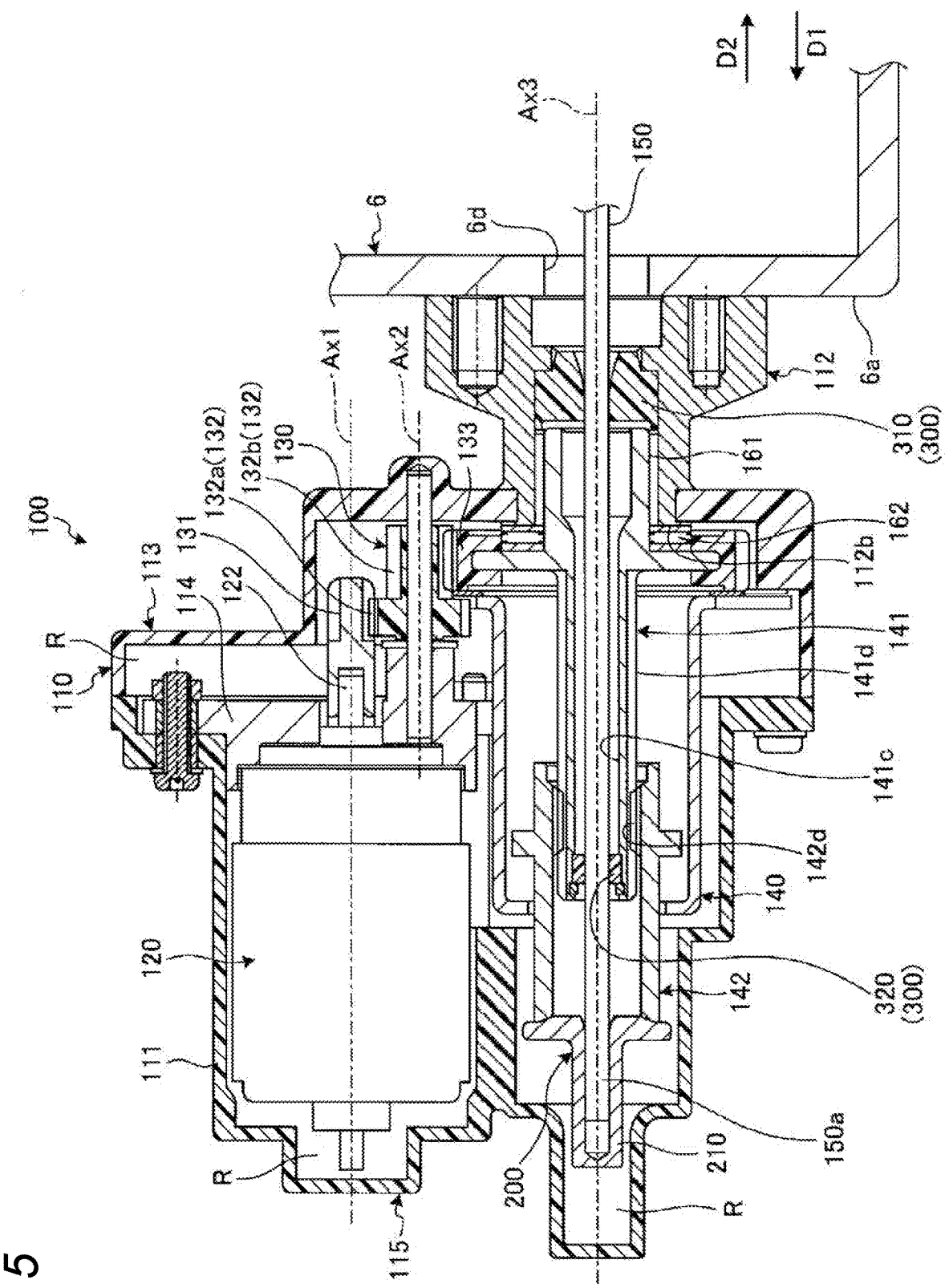
FIG. 5 is an exemplary and schematic cross-sectional view of an electric actuator of the first embodiment, and is a view in a braking state.

FIG. 5 is a cross-sectional view of the electric actuator 100 of the present embodiment, and is a view in a braking state. The electric actuator 100 pulls the brake shoe 3 (braking member) through the cable 150 to move the brake shoe 3 from the non-braking position to the braking position, as described with reference to FIG. 4.

As shown in FIG. 5, the electric actuator 100 includes a housing 110, a motor 120, a speed reduction mechanism 130, a motion conversion mechanism 140, an actuating member 200, and a guide member 300.

The housing 110 supports the motor 120, the speed reduction mechanism 130, and the motion conversion mechanism 140. The housing 110 includes a body 112 (support member), a lower case 113, an inner cover 114, and an upper case 115. These are integrated by, for example, a coupling tool (not shown) such as a screw, insert molding, or the like. An accommodation chamber R surrounded by a wall portion 111 of the housing 110 is provided in the housing 110. The motor 120, the speed reduction mechanism 130, and the motion conversion mechanism 140 are each accommodated in the accommodation chamber R and covered by the wall portion 111. The housing 110 may be called a base, a casing, or the like. The configuration of the housing 110 is not limited to the one illustrated here.

The body 112 (support member) can be made of, for example, a metal material such as an aluminum alloy. In this case, the body 112 can be manufactured by, for example, die casting. The lower case 113, the inner cover 114, and the upper case 115 can be made of, for example, a synthetic resin material. The body 112 is an example of a support member.

The motor 120 is an example of an actuator. The motor 120 has, for example, in addition to the output shaft 122, accommodating components such as a stator, a rotor, a coil, a magnet and the like. The output shaft 122 projects out in the direction D2, which is the direction along the first rotation center Ax1 of the motor 120 and is the right side in FIG. 5.

The speed reduction mechanism 130 includes a plurality of gears rotatably supported by the housing 110. The plurality of gears is, for example, a first gear 131, a second gear 132, and a third gear 133. The speed reduction mechanism 130 may be referred to as a rotation transmission mechanism.

The first gear 131 rotates integrally with the output shaft 122 of the motor 120. The first gear 131 may be referred to as a drive gear.

The second gear 132 rotates about a second rotation center Ax2 that is parallel to the first rotation center Ax1. The second gear 132 includes an input gear 132a and an output gear 132b. The input gear 132a meshes with the first gear 131. The number of teeth of the input gear 132a is larger than the number of teeth of the first gear 131. Therefore, the second gear 132 is decelerated to a rotation speed lower than that of the first gear 131. The output gear 132b is located closer to the backing plate 6 than the input gear 132a (on the right side in FIG. 5). The second gear 132 may be referred to as an idler gear.

The third gear 133 rotates about a third rotation center Ax3 that is parallel to the first rotation center Ax1. The third gear 133 meshes with the output gear 132b of the second gear 132. The number of teeth of the third gear 133 is larger than the number of teeth of the output gear 132b. Therefore, the third gear 133 is decelerated to a rotation speed lower than that of the second gear 132. The third gear 133 may be referred to as a driven gear or a ring gear. The third gear 133 is an example of a driven part. Here, the ring gear is an annular gear and is an external tooth in the present embodiment. The configuration of the speed reduction mechanism 130 is not limited to the one illustrated here. The speed reduction mechanism 130 may be a rotation transmission mechanism other than the gear mechanism, such as for example, a rotation transmission mechanism using a belt or a pulley.

Figure 6:
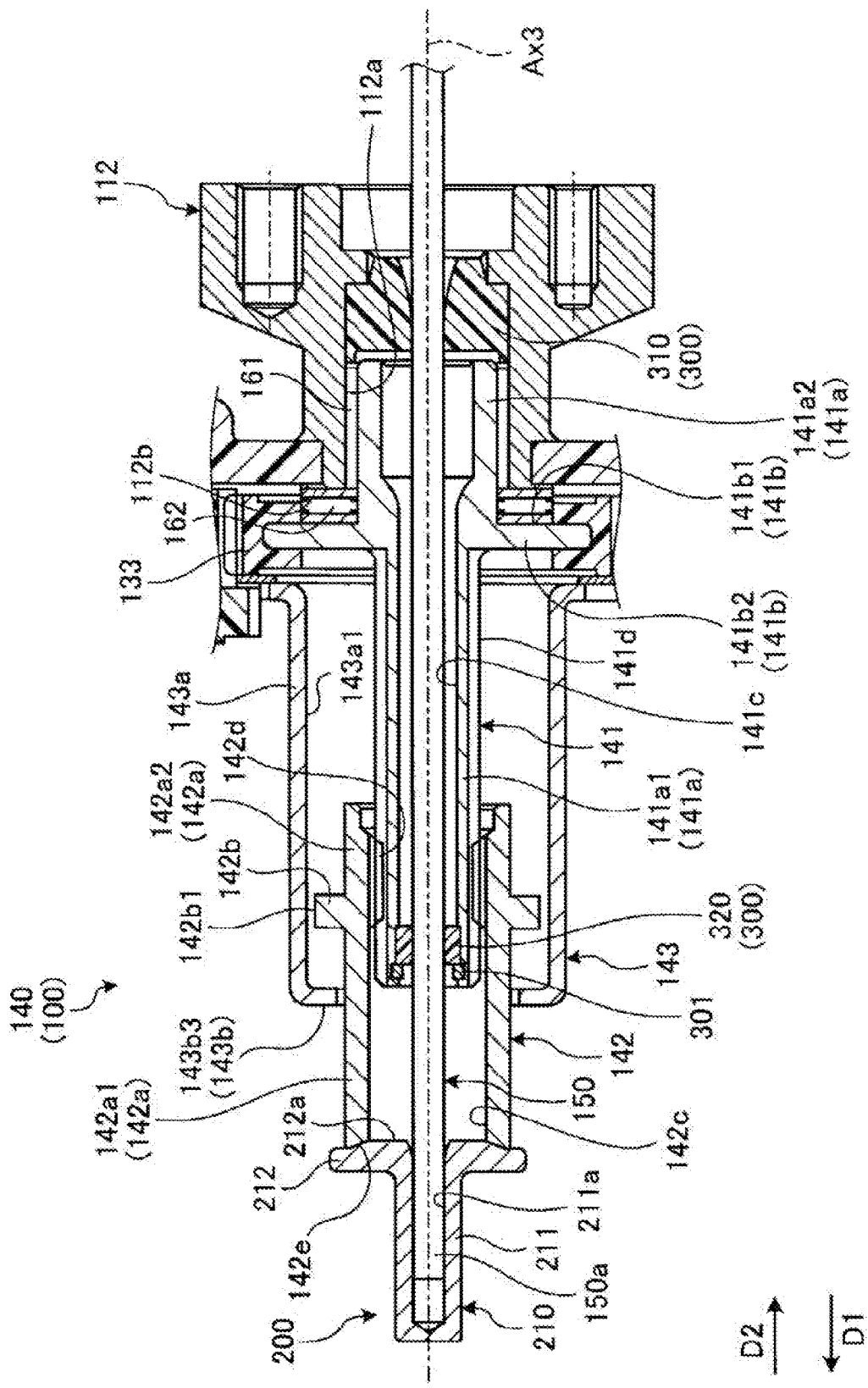
FIG. 6 is an exemplary and schematic cross-sectional view in which a part of a motion conversion mechanism of FIG. 5 is enlarged, and is a view in a braking state.

FIG. 6 is a cross-sectional view in which a part of the motion conversion mechanism 140 of FIG. 5 is enlarged, and is a view in a braking state. As shown in FIG. 6, the motion conversion mechanism 140 has a rotation member 141 and a linear motion member 142.

The rotation member 141 has a peripheral wall 141a and a flange 141b. The shape of the peripheral wall 141a is a cylinder centered on the third rotation center Ax3. A through-hole 141c that lies along the axial direction is provided inside the peripheral wall 141a.

The shape of the flange 141b is a ring shape and a plate shape. The flange 141b expands out radially outward from the peripheral wall 141a. The third gear 133 is provided on the outer periphery of the flange 141b.

The peripheral wall 141a includes a first extending portion 141a1 extending from the flange 141b in the direction D1 and a second extending portion 141a2 extending from the flange 141b in the direction D2. The length of the first extending portion 141a1 is longer than the length of the second extending portion 141a2.

A male screw 141d is provided on the outer periphery of the first extending portion 141a1. The center of the male screw 141d in the radial direction is the third rotation center Ax3. The third rotation center Ax3 is an example of the axis center.

A radial bearing 161 such as a slide bush or a roller bearing, for example, is provided between the outer periphery of the second extending portion 141a2 and the inner peripheral surface of the through-hole 112a of the body 112. A thrust bearing 162 such as a roller bearing, for example, is provided between the end face 141b1 of the flange 141b in the direction D2 and the end face 112b of the body 112 in the direction D1. The rotation member 141 is rotatably supported by the body 112 about the third rotation center Ax3 through the radial bearing 161 and the thrust bearing 162. The rotation member 141 is rotationally driven by the second gear 132 due to the meshing of the second gear 132 and the third gear 133.

The third gear 133 is made of, for example, a synthetic resin material, and the peripheral wall 141a and the disk 141b2 of the flange 141b excluding the third gear 133 can be made of, for example, a metal material such as iron or aluminum alloy. In the present embodiment, iron is used as an example. In this case, the rotation member 141 can be formed by, for example, insert molding. The rotation member 141, including the third gear 133, may be integrally formed of a metal material.

The linear motion member 142 includes a side wall 142a and a flange 142b. The side wall 142a is located radially outward with respect to the rotation member 141 and extends in the axial direction. The side wall 142a surrounds the third rotation center Ax3 and the rotation member 141. The end portion of the rotation member 141 in the direction D1 is located in the through-hole 142c. The side wall 142a has a first extending portion 142a1 extending from the flange 142b in the direction D1 and a second extending portion 142a2 extending from the flange 142b in the direction D2. The length of the first extending portion 142a1 is longer than the length of the second extending portion 142a2.

A female screw 142d that meshes with the male screw 141d of the rotation member 141 is provided on the inner surface of the through-hole 142c. The female screw 142d is provided in a section from the end portion of the through-hole 142c in the direction D2 to the position aligned with the flange 142b in the radial direction, and is not provided at the end portion of the through-hole 142c in the direction D1. Furthermore, the flange 142b is surrounded by a rotation stopping member 143 extending in the axial direction.

The rotation stopping member 143 has a side wall 143a. The side wall 143a is located radially outward with respect to the flange 142b and extends in the axial direction. The side wall 143a surrounds the third rotation center Ax3 and the periphery of the rotation member 141, and the side wall 143a has a tubular or cylindrical shape. The side wall 143a may also be referred to as a peripheral wall.

The actuating member 200 includes a transmission member 210 and a cable 150 coupled to the transmission member 210. The transmission member 210 includes a cylindrical portion 211 and a flange portion 212 formed integrally with the cylindrical portion 211. A concave portion 211a extending in the axial direction is provided inside the cylindrical portion 211. The cable 150 has flexibility. The end portion 150a of the cable 150 is coupled to the transmission member 210 by being inserted into the concave portion 211a and caulked. The cable 150 passes through the through-hole 141c of the rotation member 141 and extends in the axial direction. The flange portion 212 spreads in a disk shape from the end portion of the cylindrical portion 211 in the direction D2 toward the outside in the radial direction. The side surface 212a of the flange portion 212 on the direction D2 side (right side in FIG. 6) is pressed from the end face 142e of the linear motion member 142 toward the direction D1 (left side in FIG. 6). Thus, the actuating member 200 receives a force for actuating the brake shoe 3 (braking member, see FIG. 4) from the linear motion member 142. That is, the actuating member 200 is configured such that one end (the transmission member 210) receives a force for actuating the brake shoe 3 from the linear motion member 142, and the other end (the end portion 150b of the cable 150) actuates the brake shoe 3.

The body 112 is provided with a first guide member 310, and the through-hole 141c is provided with a C ring 301 and a second guide member 320, which will be described later.

Figure 7:
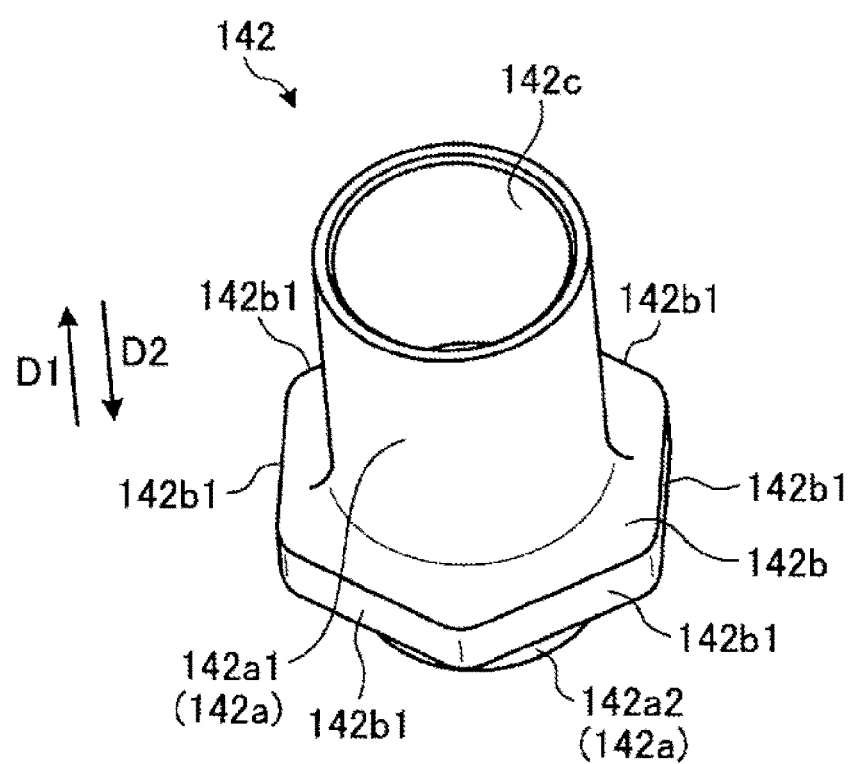
FIG. 7 is an exemplary and schematic perspective view of a linear motion member of the first embodiment.

FIG. 7 is a perspective view of the linear motion member 142 of the present embodiment. As shown in FIG. 7, the shape of the side wall 142a of the linear motion member 142 is a cylindrical shape centered on the third rotation center Ax3. The side wall 142a may also be referred to as a peripheral wall. A through-hole 142c that lies along the axial direction is provided inside the side wall 142a. The flange 142b provided on the linear motion member 142 has a hexagonal plate shape. Each of the six outer surfaces 142b1 of the flange 142b is a planar shape extending in the axial direction. The linear motion member 142 can be formed by, for example, forging a metal material such as an aluminum alloy.

Figure 8:
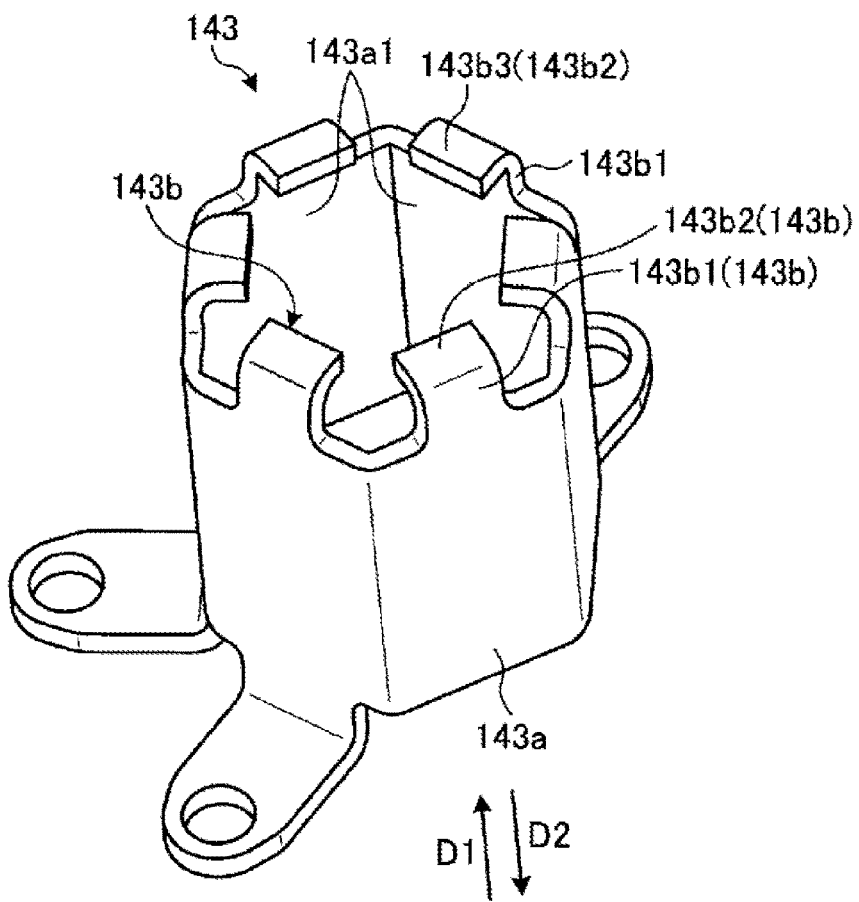
FIG. 8 is an exemplary and schematic perspective view of a rotation stopping member of the first embodiment.

FIG. 8 is a perspective view of the rotation stopping member 143 of the present embodiment. As shown in FIG. 8, the rotation stopping member 143 can be formed by press-forming or bending a plate material of a metal material such as an iron-based material. The side wall 143a has a hexagonal cylindrical shape. The six inner surfaces 143a1 of the side wall 143a are planes extending in the axial direction.

Furthermore, six protrusions 143b bent in an L shape from the end portion of the side wall 143a in the direction D1 are provided. The protrusion 143b has a base portion 143b1 extending in the axial direction from the side wall 143a, and a bent portion 143b2 bent from the distal end of the base portion 143b1 toward the radial center. As shown in FIGS. 6 and 8, the end face 143b3 of the bent portion 143b2 in the direction D1 is formed in a planar shape. Furthermore, in the present embodiment, the rotation stopping member 143 has six protrusions 143b, but may have two protrusions 143b, or may have six or more protrusions 143b.

The rotation stopping member 143 is, for example, fixed to the housing 110 such as the body 112 or the upper case 115. As shown in FIG. 6, a minute gap is formed between the outer surface 142b1 of the flange 142b and the inner surface 143a1 of the side wall 143a in a state parallel to each other, and both the outer surface 142b1 and the inner surface 143a1 extend in the direction intersecting the circumferential direction.

Therefore, the rotation of the outer surface 142b1 about the third rotation center Ax3 is limited by the inner surface 143a1, and thus the rotation of the linear motion member 142 is limited by the rotation stopping member 143. On the other hand, since the outer surface 142b1 and the inner surface 143a1 both extend in the axial direction, the inner surface 143a1 does not become a hindrance to the movement of the outer surface 142b1 in the axial direction. That is, the rotation stopping member 143 can guide the linear motion member 142 along the axial direction while limiting the rotation of the linear motion member 142 about the third rotation center Ax3. The inner surface 143a1 is an example of a guide portion.

Figure 9:
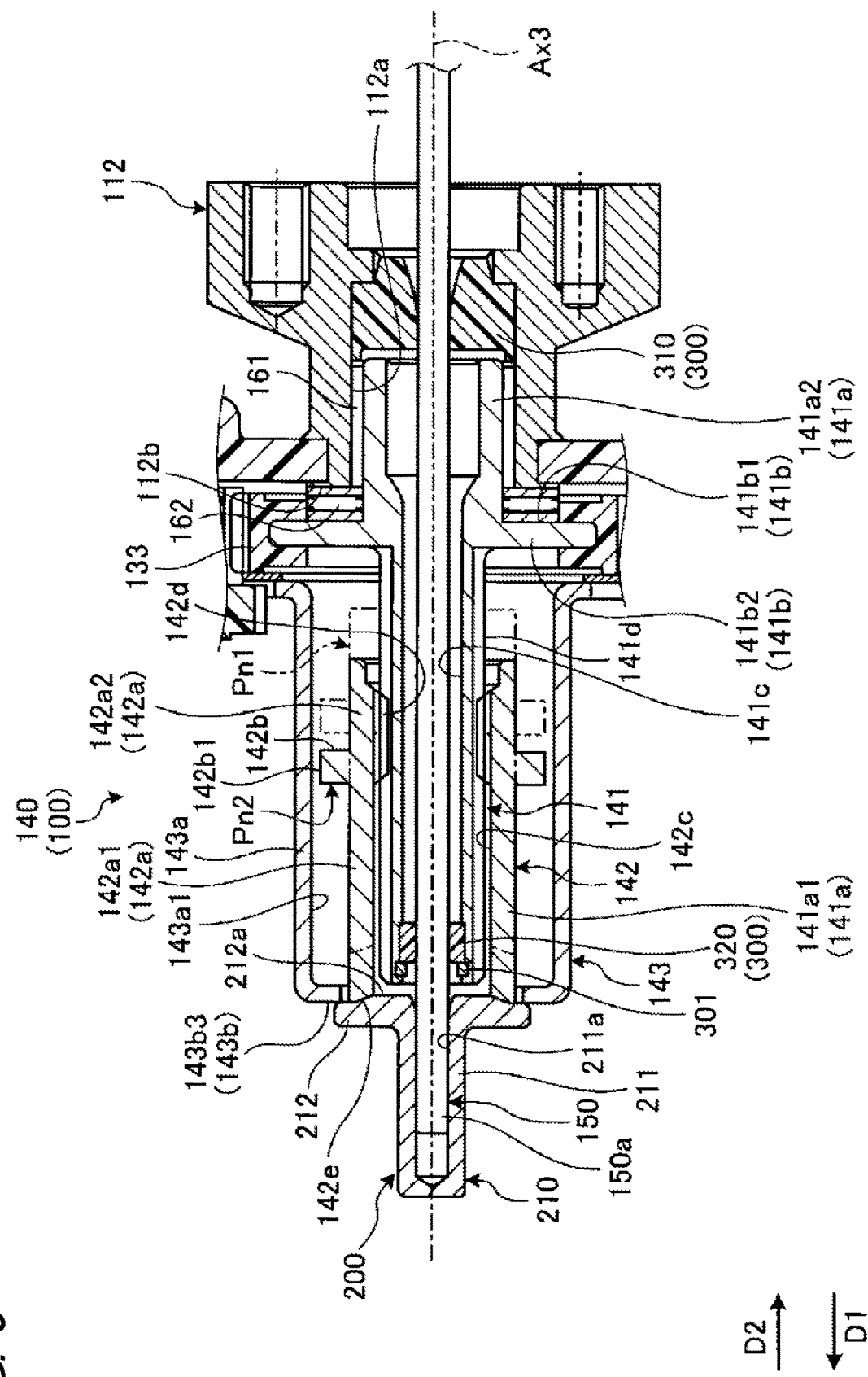
FIG. 9 is an exemplary and schematic cross-sectional view in which a part of the motion conversion mechanism of FIG. 5 is enlarged, and is a view in a non-braking state.

The procedure for actuating the brake device will be briefly described below. FIG. 9 is a cross-sectional view in which a part of the motion conversion mechanism 140 of FIG. 5 is enlarged, and is a view in a non-braking state.

The rotation of the output shaft 122 of the motor 120 is transmitted to the rotation member 141 through the speed reduction mechanism 130. In the non-braking state shown in FIG. 9, when the rotation member 141 rotates, the linear motion member 142 moves from position Pn1 in FIG. 9 toward the direction D1 due to the male screw 141d of the rotation member 141 meshing with the female screw 142d of the linear motion member 142, and the inner surface 143a1 of the rotation stopping member 143 limiting the rotation of the outer surface 142b1 of the linear motion member 142.

At position Pn2, the end face 142e of the linear motion member 142 presses the side surface 212a of the flange portion 212 and pushes the transmission member 210 in the direction D1. Then, the transmission member 210 and the cable 150 move in the direction D1, and as shown in FIG. 4, as the end portion 150b of the cable 150 moves toward the right in FIG. 4, the lever 81 moves toward the arrow a, and the brake device 2 is braked. Note that, in FIG. 9, the movement of the transmission member 210 in the direction D2 is limited by the abutment of the side surface 212a with the end face 143b3. In other words, the end face 143b3 acts as a stopper of the actuating member 200, and the state of FIG. 9 becomes the initial position of the actuating member 200.

Figure 10:
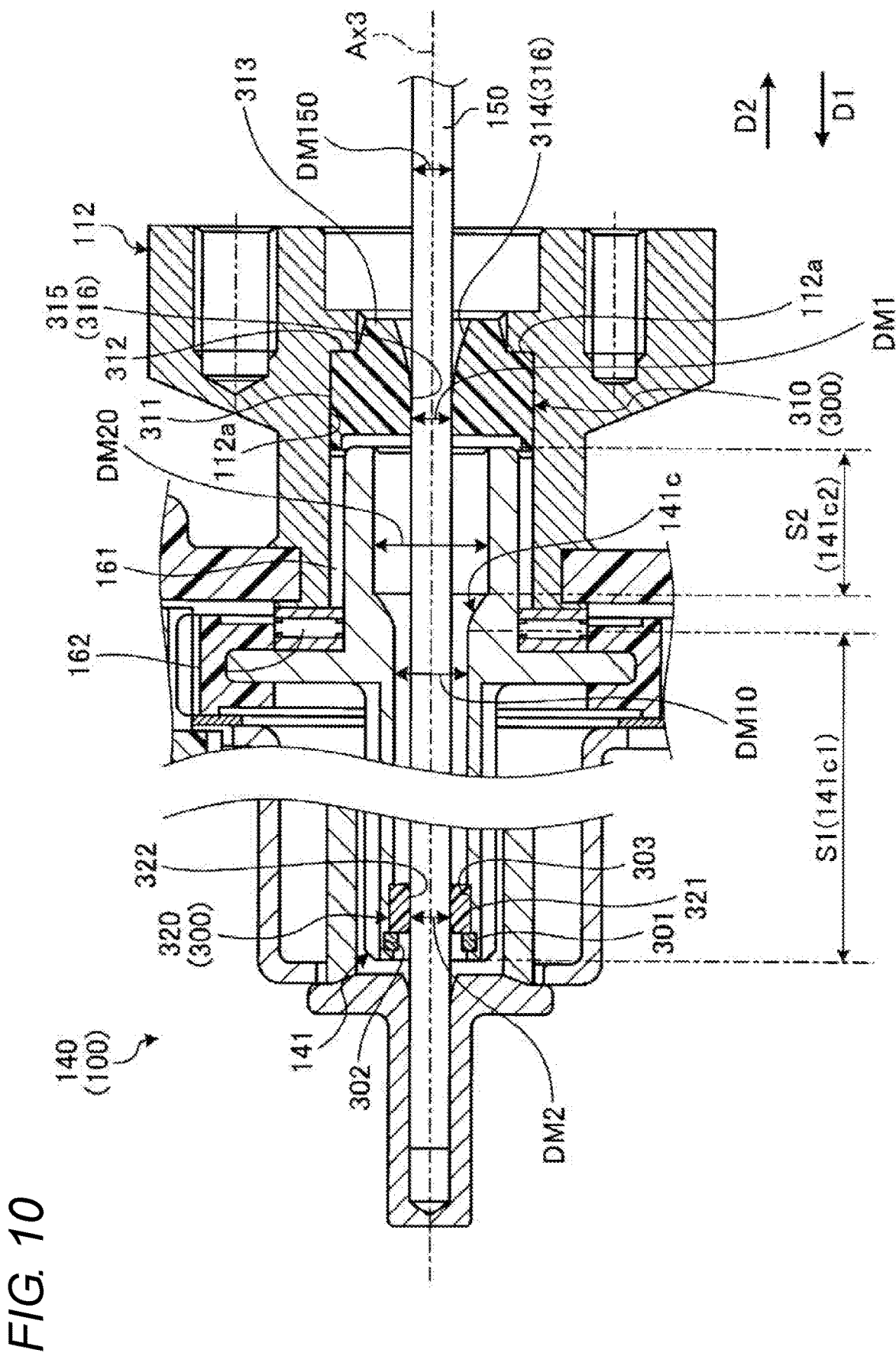
FIG. 10 is an exemplary and schematic cross-sectional view in which a part of FIG. 9 is omitted and enlarged.

FIG. 10 is a cross-sectional view in which a part of FIG. 9 is omitted and enlarged. As shown in FIG. 10, in the present embodiment, a first guide member 310 and a second guide member 320 are provided as the guide member 300. The number of guide members is not limited to two and may be one or three or more.

A through-hole 112a is provided in the body 112 along the third rotation center Ax3 (axial direction), and the first guide member 310 is accommodated in the through-hole 112a. The first guide member 310 is a cylindrical member extending in the axial direction, and has an outer peripheral surface 311, an end face 312, a convex portion 313, a first inner peripheral surface 314, and a second inner peripheral surface 315. The outer peripheral surface 311 has a cylindrical shape and is fitted to the inner surface of the through-hole 112a. The end face 312 extends in the radial direction from the end edge of the outer peripheral surface 311 in the direction D2. The convex portion 313 has a ring shape and projects out from the end face 312 toward the direction D2 side (right side in FIG. 10). A guide hole 316 that passes through along the axial direction is provided at the center of the convex portion 313 in the radial direction. The guide hole 316 passes through the first guide member 310 in the axial direction. The first guide member 310 has, as an inner peripheral surface forming the guide hole 316, a first inner peripheral surface 314 on the direction D2 side (right side in FIG. 10) and a second inner peripheral surface 315 on the direction D1 side (left side in FIG. 10). The first inner peripheral surface 314 extends while curving so that the inner diameter increases in the direction D2. The second inner peripheral surface 315 is a cylindrical surface having a constant inner diameter DM1 along the axial direction. The inner diameter DM1 is slightly larger than the outer diameter DM150 of the cable 150. Therefore, when the cable 150 moves in the axial direction, the cable 150 is slidably guided by the second inner peripheral surface 315.

The through-hole 141c of the rotation member 141 has a small diameter portion 141c1 and a large diameter portion 141c2. The small diameter portion 141c1 is provided in a first section 51 extending from the end edge of the rotation member 141 in the direction D1 toward the direction D1 to a position aligned in the radial direction with the thrust bearing 162. The large diameter portion 141c2 is provided in a second section S2 extending from the position aligned in the radial direction with the end portion of the radial bearing 161 in the direction D1 to the end edge of the rotation member 141 in the direction D2. The inner diameter of the small diameter portion 141c1 is DM10, and the inner diameter of the large diameter portion 141c2 is DM20. The inner diameter DM20 is set larger than the inner diameter DM10. The small diameter portion 141c1 is an example of the smallest inner diameter portion having the smallest diameter in the through-hole 141c of the rotation member 141. A first recessed groove 303 that is recessed outward in the radial direction is provided on the inner peripheral surface of the small diameter portion 141c1. The second guide member 320, which is a cylindrical member, is accommodated in the first recessed groove 303. Specifically, the outer peripheral portion 321 of the second guide member 320 is fitted into the first recessed groove 303. A second recessed groove 302 is provided adjacent to the direction D1 of the first recessed groove 303, and a C ring 301 is fitted into the second recessed groove 302. The axial movement of the second guide member 320 is stopped by the C ring 301. The second guide member 320 is provided with a guide hole 322, and the inner diameter of the guide hole 322 is set to a constant inner diameter DM2 along the axial direction. The inner diameter DM2 is substantially the same as the inner diameter DM1 and is slightly larger than the outer diameter DM150 of the cable 150. Therefore, when the cable 150 moves in the axial direction, the cable 150 is slidably guided by the guide hole 322.

Here, the first guide member 310 is provided in the through-hole 112a of the body 112 at a position different from the small diameter portion 141c1. The second guide member 320 is provided in the small diameter portion 141c1. The inner diameter DM1 and the inner diameter DM2 are set to be smaller than DM10. The first guide member 310 and the second guide member 320 are made of a material different from the metal material forming the rotation member 141, for example, a synthetic resin material having higher sliding property (lower coefficient of friction) or that is less likely to wear than the metal material forming the rotation member 141 in consideration of sliding movement with the actuating member 200. Examples of such synthetic resin material include, for example, polyacetal (POM), polyamide (PA), and polytetrafluoroethylene (PTFE; fluororesin).

As described above, in the present embodiment, the brake device 2 includes the brake shoe 3 (braking member) and the electric actuator 100. The electric actuator 100 includes a motor 120, a motion conversion mechanism 140 including a rotation member 141 having a male screw 141d and a linear motion member 142 having a female screw 142d, an actuating member 200, and a guide member 300 for guiding the actuating member 200. The rotation member 141 is rotationally driven through the third gear 133 (driven part), the male screw 141d and the female screw 142d mesh with each other on the side opposite to the brake shoe 3 of the third gear 133, the transmission member 210 (one end of the actuating member 200) receives force for actuating the brake shoe 3 from the linear motion member 142, and the end portion 150b of the cable 150 (other end of the actuating member 200) actuates the brake shoe 3. The rotation member 141 is provided with a through-hole 141c that lies along the axial direction, and the transmission member 210 is located on the side opposite to the brake shoe 3 of the through-hole 141c. The guide member 300 is made of a material different from that of the rotation member 141 and slidably guides the actuating member 200 in the axial direction.

According to such a configuration, for example, as compared with the aspect in which the linear motion member having the male screw linearly moves according to the rotation of the rotation member having the female screw as in Patent Literature 1, the electric actuator 100 can be further downsized in the radial direction since the diameter of the bearing supporting the rotation member 141 tends to be small, and as smaller diameter of the bearing reduces the sliding speed of the bearing at the same rotation speed, durability such as wear resistance can be easily improved. Furthermore, for example, as compared with the aspect in which the output shaft of the motor or a member that rotates in conjunction with the output shaft is coupled to an end face in the axial direction of the rotation member of the motion conversion mechanism as in Patent Literature 2, the entire length of the electric actuator 100 can be further shortened easily. Therefore, an advantage in that the in-vehicle space can be easily ensured by the miniaturization of the electric actuator 100 and an advantage in that durability can be improved are obtained. Furthermore, for example, as compared with the aspect in which the male screw 141d and the female screw 142d are meshed with each other on the brake shoe 3 side (braking member side) with respect to the third gear 133 (driven part), the third gear 133 can be arranged closer to the brake shoe 3. Therefore, for example, since a relatively large portion for accommodating the third gear 133 of the body 112 does not need to be provided on the side far from the brake shoe 3 of the brake device 2, advantages such as the brake device 2 can be configured more compactly, and the vibration energy when the brake device 2 vibrates can be made smaller are obtained. Then, for example, as compared with the aspect in which the actuating member 200 is arranged so as to circumvent the outside in the radial direction of the third gear 133, the actuating member 200 can be arranged in a linearly extended state closer to the axis center of the rotation member, and thus the reaction force applied to the actuation of the brake shoe 3 can be suppressed from acting in the direction intersecting the axis center. Furthermore, since the electric actuator 100 includes the guide member 300 that slidably guides the actuating member 200 in the axial direction, the sliding resistance involved in the movement of the actuating member 200 can be further reduced. Moreover, compared to the configuration without the guide member 300, the actuating member 200 and the inner peripheral surface of the through-hole 141c of the rotation member 141 become difficult to directly slide with respect to each other, and consequently, effects such as the sliding resistance becomes smaller and the actuating member 200 and the inner peripheral surface are less likely to be worn out are obtained.

In addition, in the present embodiment, the actuating member 200 includes the cable 150 having flexibility. According to such a configuration, for example, even when the actuating member 200 includes the cable 150 having flexibility, the effects described above due to the provision of the guide member 300 can be obtained.

Furthermore, in the present embodiment, the actuating member 200 is configured to be separable from the linear motion member 142, and the guide member 300 includes two (a plurality of) guide members, first guide member 310 and second guide member 320, where the second guide member 320 is located in the through-hole 141c. With such a configuration, for example, the posture change of the actuating member 200 is easily suppressed by the two (plurality of) guide members, the first guide member 310 and the second guide member 320, and the actuating member 200 and the inner peripheral surface of the through-hole 141c of the rotation member 141 become difficult to directly slide with respect to each other as the second guide member 320 (one guide member) is located in the through-hole 141c. Furthermore, as in the present embodiment, in the configuration in which the actuating member 200 is driven through the transmission member 210 that is configured to be separable from the linear motion member 142, even in a case where the transmission member 210 is arranged shifted in the radial direction with respect to the center of the through-hole 141c, the direct sliding between the cable 150 and the inner peripheral surface of the through-hole 141c can be suppressed, and consequently, the wear of the rotation member 141 and the torque loss can be suppressed.

Moreover, in the present embodiment, the second guide member 320 (guide member) is provided at the end portion of the through-hole 141c on the side opposite to the brake shoe 3. With such a configuration, for example, it becomes difficult for the actuating member 200 and the end portion of the inner peripheral surface of the through-hole 141c on the side closer to the transmission member 210 to directly slide.

Furthermore, in the present embodiment, the first guide member 310 (guide member) is provided on the body 112 (support member) that rotatably supports the rotation member 141 on the brake shoe 3 side in the axial direction. According to such a configuration, for example, since the guide member is supported by the body 112 which does not rotate, the rotation of the first guide member 310 is suppressed, and therefore, as compared with a case where the guide member is supported by the rotation member 141, the sliding speed between the first guide member 310 and the actuating member 200 can be reduced, and consequently, wear of the actuating member 200 and the first guide member 310 can be easily suppressed.

Moreover, in the present embodiment, the first guide member 310 (guide member 300) is a cylindrical member provided with a guide hole 316 having a diameter smaller than that of the small diameter portion 141c1 (smallest inner diameter portion) having the smallest diameter in the through-hole 141c so as to pass therethrough, and provided on the body 112 (position different from the small diameter portion 141c1). According to such a configuration, for example, the thickness of the first guide member 310 can be set to be larger than that of the guide member provided in the small diameter portion 141c1, and thus for example, wear can be reduced by giving elasticity to the first guide member 310, and the durability of the first guide member 310 can be improved.

Moreover, in the present embodiment, the second guide member 320 (guide member 300) is a cylindrical member provided with a guide hole 322 having a diameter smaller than that of the small diameter portion 141c1 (smallest inner diameter portion) having the smallest diameter in the through-hole 141c so as to pass therethrough, and provided in the small diameter portion 141c1. The small diameter portion 141c1 of the through-hole 141c is a portion where the cable 150 and the through-hole 141c easily slide directly. Therefore, according to such a configuration, for example, it becomes more difficult for the cable 150 and the inner peripheral surface of the through-hole 141c of the rotation member 141 to slide more directly.

Modified Example of First Embodiment

Figure 11:
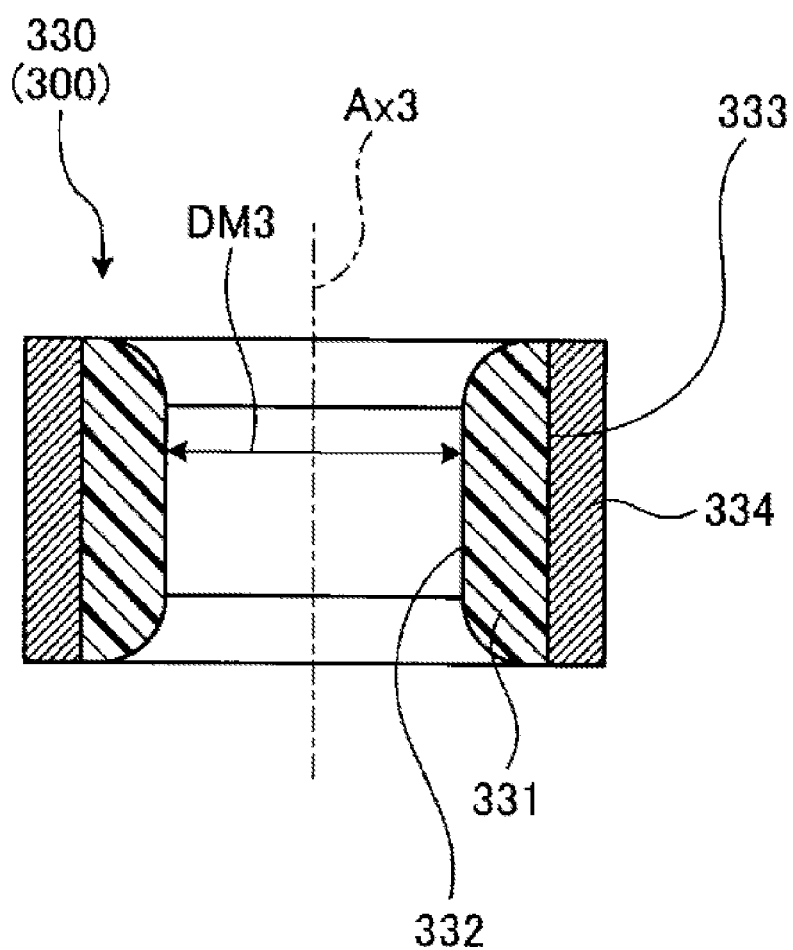
FIG. 11 is an exemplary and schematic cross-sectional view of a third guide member according to a modified example of the first embodiment.

FIG. 11 is a cross-sectional view of the third guide member 330 according to a modified example of the first embodiment. The third guide member 330 includes a first cylindrical portion 331 made of synthetic resin and a second cylindrical portion 334 made of metal. The inner peripheral surface of the first cylindrical portion 331 is a guide hole 332, and the inner diameter is set to DM3. The outer peripheral surface 333 of the first cylindrical portion 331 and the second cylindrical portion 334 are coupled and configured as an integrated part by insert molding the second cylindrical portion 334 on the outer peripheral side of the first cylindrical portion 331. The first cylindrical portion 331 is made of a material different from that of the rotation member 141, for example, the same material as the first guide member 310 and the second guide member 320. According to this modified example as well, the same effects as those of the first embodiment can be obtained. Furthermore, according to this modified example, for example, an effect that the holding strength of the third guide member 330 to the rotation member 141 is improved by the second cylindrical portion 334 made of metal having high rigidity can be obtained.

Second Embodiment

Figure 12:
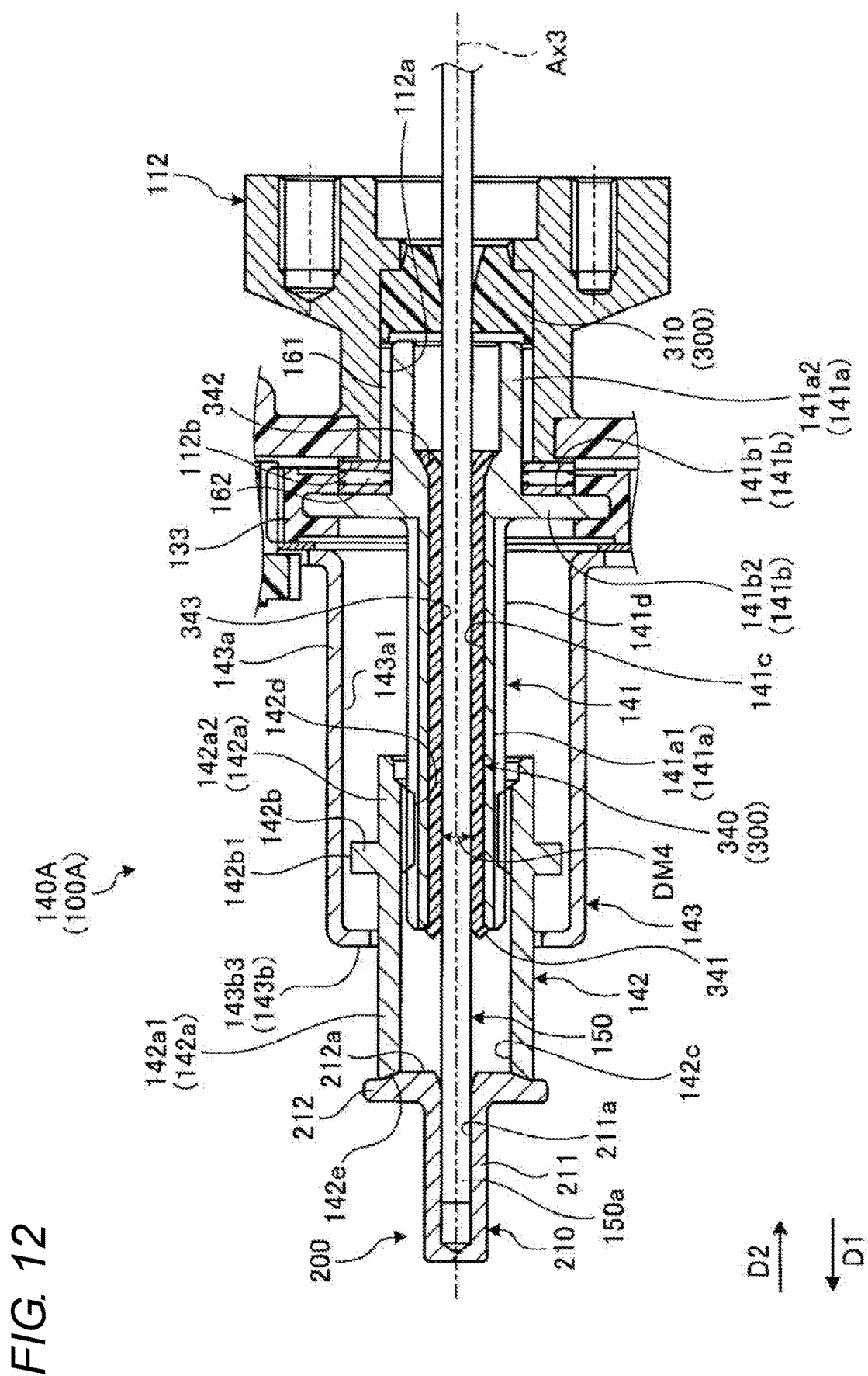
FIG. 12 is an exemplary and schematic cross-sectional view in which a part of a motion conversion mechanism according to a second embodiment is enlarged, and is a view in a braking state.

FIG. 12 is a cross-sectional view in which a part of a motion conversion mechanism 140A according to a second embodiment is enlarged, and is a view in a braking state. In the present embodiment, as shown in FIG. 12, a fourth guide member 340 (guide member) is provided over the entire length of the small diameter portion 141c1 (see FIG. 10) which is the smallest inner diameter portion. The fourth guide member 340 is a cylindrical member that has an end portion 341 in the direction D1 and an end portion 342 in the direction D2 and that extends between the end portions 341, 342 in an axially elongated shape. The diameter of the end portion 341 increases in the direction D1 and the diameter of the end portion 342 increases in the direction D2. The end portions 341, 342 may be referred to as an expanded diameter portion. The fourth guide member 340 is provided with a guide hole 343 that passes through in the axial direction. The inner diameter DM4 of the guide hole 343 is constant along the axial direction, and is slightly larger than the outer diameter DM150 (see FIG. 10) of the cable 150. Therefore, when the cable 150 moves in the axial direction, the cable 150 is slidably guided by the guide hole 343. The fourth guide member 340 is made of a material different from that of the rotation member 141, for example, the same material as the first guide member 310 and the second guide member 320.

As described above, in the present embodiment, the fourth guide member 340 and the fifth guide member 350 (guide member 300) are cylindrical members provided with the guide holes 343, 354 having a diameter smaller than the smallest inner diameter portion so as to pass therethrough, and provided in the small diameter portion 141c1 (smallest inner diameter portion). According to such a configuration, for example, since the fourth guide member 340 is provided in the small diameter portion 141c1 (smallest inner diameter portion), which is the portion that most easily slides directly with the cable 150 in the axial direction of the through-hole 141c, the direct sliding between the cable 150 and the inner peripheral surface of the through-hole 141c can be further suppressed, and consequently, the wear of the rotation member 141 and the torque loss can be suppressed.

Modified Example of Second Embodiment

Figure 13:
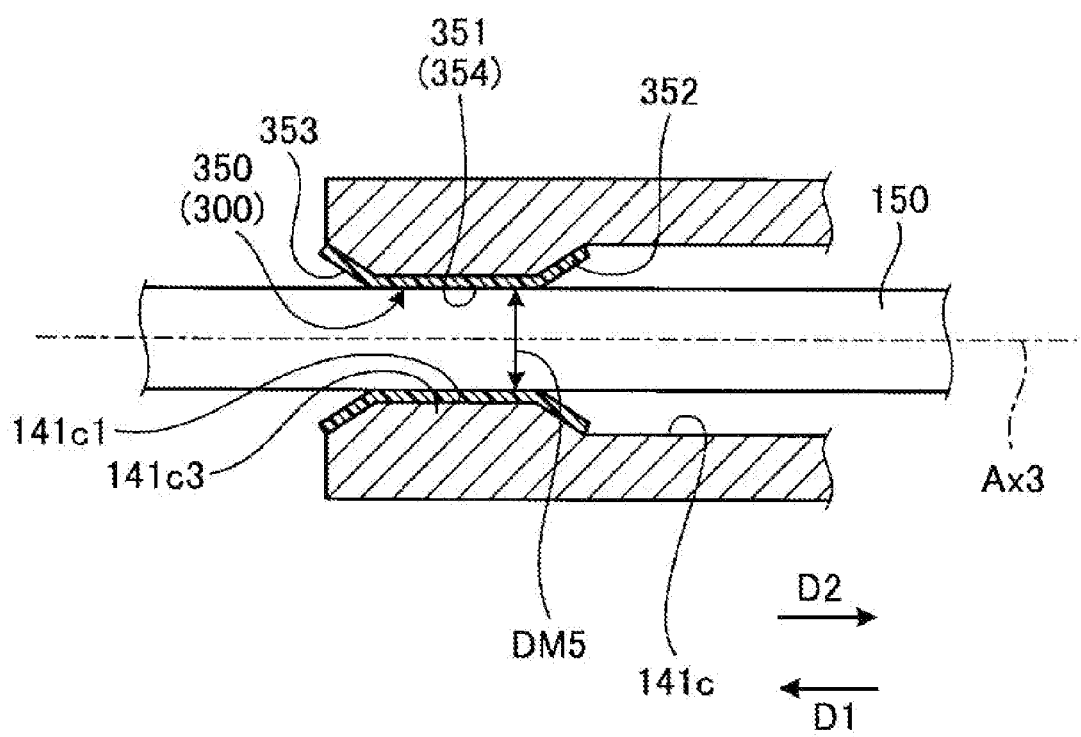
FIG. 13 is an exemplary and schematic cross-sectional view of a fifth guide member according to a modified example of the second embodiment.

FIG. 13 is a cross-sectional view of the fifth guide member 350 according to the modified example of the second embodiment. As shown in FIG. 13, a protruding portion 141c3 that is convex radially inward is provided in an annular shape along the circumferential direction of the third rotation center Ax3 at the end portion of the through-hole 141c in the direction D1. The inner peripheral surface of the protruding portion 141c3 is the small diameter portion 141c1 (smallest inner diameter portion), and the fifth guide member 350 (guide member) is provided on the inner peripheral surface. The fifth guide member 350 is a cylindrical member that has an end portion 353 in the direction D1 and an end portion 352 in the direction D2 and that extends between the end portions 352, 353 in an axially elongated shape. The center in the axial direction is formed into a cylindrical portion 351 in which the size of the diameter along the axial direction is constant. The diameter of the end portion 353 increases in the direction D1, and the diameter of the end portion 352 increases in the direction D2. The end portions 352, 353 may be referred to as the expanded diameter portion. The fifth guide member 350 is provided with a guide hole 354 passing through in the axial direction. The inner diameter DM5 of the guide hole 354 is slightly larger than the outer diameter DM150 (see FIG. 10) of the cable 150. Therefore, when the cable 150 moves in the axial direction, the cable 150 is slidably guided by the guide hole 354. The fifth guide member 350 is made of a material different from that of the rotation member 141, for example, the same material as the first guide member 310 and the second guide member 320. According to this modified example as well, the same effects as those of the second embodiment can be obtained. Moreover, according to the present modified example, for example, since the fifth guide member 350 is provided on the protruding portion 141c3 of the rotation member 141, for example, the radial thickness can be set to be thinner than that of the second guide member 320 (see FIG. 10).

The embodiments of the present disclosure have been exemplified above, but the embodiments described above are merely examples and are not intended to limit the scope of the present disclosure. The embodiments described above can be implemented in various other forms, and various omissions, replacements, combinations, and changes can be made within a scope not deviating from the gist of the disclosure. In addition, the specifications of each configuration, shape, and the like (structure, type, direction, form, size, length, width, thickness, height, number, arrangement, position, material, etc.) can be appropriately changed and implemented.

For example, the guide member 300 may be provided at the end portion of the through-hole 141c on the brake shoe 3 (braking member) side. With such a configuration, for example, it becomes difficult for the actuating member 200 and the end portion on the brake shoe 3 side of the inner peripheral surface of the through-hole 141c to directly slide. The actuating member 200 may be coupled with the linear motion member 142.

The invention claimed is:

1. A brake device comprising:
    a braking member that is pressed against a drum rotor that rotates integrally with a wheel to brake the drum rotor;
    a backing plate that supports the braking member; and
    an electric actuator that is provided on the backing plate and that actuates the braking member, wherein
    the electric actuator includes,
    a motor having a rotating output shaft,
    a motion conversion mechanism including a rotation member that includes a male screw and rotates about an axis center of the male screw in conjunction with the output shaft, and a linear motion member that includes a female screw that meshes with the male screw and linearly moves accompanying the rotation of the rotation member,
    an actuating member that receives a force for actuating the braking member from the linear motion member, and
    a guide member that guides the actuating member;
    the rotation member is rotationally driven through a driven part that is provided on an outer periphery of the rotation member and rotates in conjunction with the output shaft;
    the male screw and the female screw mesh with each other on a side opposite to the braking member of the driven part;
    the actuating member is configured such that one end receives a force for actuating the braking member from the linear motion member and the other end actuates the braking member;
    the rotation member is provided with a through-hole that lies along an axial direction of the axis center;
    the actuating member passes through the through-hole;
    the one end of the actuating member is arranged on a side opposite to the braking member of the through-hole; and
    the guide member is made of a material different from the rotation member and slidably guides the actuating member in the axial direction.

2. The brake device according to claim 1, wherein the actuating member includes a cable having flexibility.

3. The brake device according to claim 1, wherein
    the actuating member includes a transmission member configured to be separable from the linear motion member in the axial direction to transmit a force for actuating the braking member from the linear motion member to the actuating member, and
    wherein the guide member is one of a plurality of guide members, at least one of the plurality of guide members being arranged in the through-hole.

4. The brake device according to claim 1, wherein the guide member is provided at an end portion on a side opposite to the braking member in the through-hole.

5. The brake device according to claim 1, wherein the guide member is provided at an end portion on the braking member side in the through-hole.

6. The brake device according to claim 1, wherein the guide member is provided on a support member that rotatably supports the rotation member on the braking member side in the axial direction.

7. The brake device according to claim 1, wherein the guide member is a cylindrical member provided with a guide hole having a diameter smaller than a smallest inner diameter portion that has a smallest diameter, in the through-hole so as to pass therethrough and provided at a position different from the smallest inner diameter portion.

8. The brake device according to claim 1, wherein the guide member is a cylindrical member provided with a guide hole having a diameter smaller than a smallest inner diameter portion, which has a smallest diameter, in the through-hole so as to pass therethrough and provided in the smallest inner diameter portion.

9. The brake device according to claim 2, wherein
the actuating member includes a transmission member configured to be separable from the linear motion member in the axial direction to transmit a force for actuating the braking member from the linear motion member to the actuating member, and
wherein the guide member is one of a plurality of guide members, at least one of the plurality of guide members being arranged in the through-hole.

10. The brake device according to claim 2, wherein the guide member is provided at an end portion on a side opposite to the braking member in the through-hole.

11. The brake device according to claim 2, wherein the guide member is provided at an end portion on the braking member side in the through-hole.

12. The brake device according to claim 2, wherein the guide member is provided on a support member that rotatably supports the rotation member on the braking member side in the axial direction.

13. The brake device according to claim 2, wherein the guide member is a cylindrical member provided with a guide hole having a diameter smaller than a smallest inner diameter portion that has a smallest diameter, in the through-hole so as to pass therethrough and provided at a position different from the smallest inner diameter portion.

14. The brake device according to claim 2, wherein the guide member is a cylindrical member provided with a guide hole having a diameter smaller than a smallest inner diameter portion, which has a smallest diameter, in the through-hole so as to pass therethrough and provided in the smallest inner diameter portion.

15. The brake device according to claim 3, wherein one of the guide members is provided at an end portion on a side opposite to the braking member in the through-hole.

16. The brake device according to claim 3, wherein one of the guide members is provided at an end portion on the braking member side in the through-hole.

17. The brake device according to claim 3, wherein one of the guide members is provided on a support member that rotatably supports the rotation member on the braking member side in the axial direction.

18. The brake device according to claim 3, wherein one of the guide members is a cylindrical member provided with a guide hole having a diameter smaller than a smallest inner diameter portion that has a smallest diameter, in the through-hole so as to pass therethrough and provided at a position different from the smallest inner diameter portion.

19. The brake device according to claim 3, wherein one of the guide members is a cylindrical member provided with a guide hole having a diameter smaller than a smallest inner diameter portion, which has a smallest diameter, in the through-hole so as to pass therethrough and provided in the smallest inner diameter portion.

* * * * *